(12) United States Patent
Kalemba

(10) Patent No.: US 6,309,207 B1
(45) Date of Patent: *Oct. 30, 2001

(54) INJECTION MOLDING NOZZLE ASSEMBLY

(75) Inventor: Jacek Kalemba, Mississauga (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,681

(22) Filed: Feb. 8, 2000

Related U.S. Application Data

(62) Division of application No. 09/095,110, filed on Jun. 10, 1998, now Pat. No. 6,062,846.

(51) Int. Cl.⁷ .................................................. B29C 45/20
(52) U.S. Cl. ...................................... 425/549; 264/328.15
(58) Field of Search ...................... 425/549; 264/328.15

(56) References Cited

U.S. PATENT DOCUMENTS

| | | | |
|---|---|---|---|
| 4,173,448 | * 11/1979 | Rees et al. ............................ | 425/549 |
| 4,333,608 | 6/1982 | Hendry ................................. | 239/118 |
| 4,588,367 | * 5/1986 | Schad ................................... | 425/549 |
| 4,662,837 | * 5/1987 | Anderson ............................. | 425/549 |
| 4,682,837 | * 7/1987 | Schad ................................... | 425/549 |
| 5,049,062 | 9/1991 | Gellert ................................. | 425/549 |
| 5,374,182 | * 12/1994 | Gessner ............................... | 425/562 |
| 5,533,882 | * 7/1996 | Gessner ............................... | 425/564 |
| 6,062,846 | * 5/2000 | Kalemba ............................. | 425/549 |

FOREIGN PATENT DOCUMENTS

| | | |
|---|---|---|
| 1153523 | 9/1983 | (CA) . |
| 2060282 | 12/1970 | (DE) . |
| 2137430 | 7/1971 | (DE) . |
| 29501450.4 | 1/1995 | (DE) . |
| 1373040 | 11/1974 | (GB) . |

OTHER PUBLICATIONS

German Paper Kunststoffe 75 (1985) 12, p. 880.

* cited by examiner

Primary Examiner—Tim Heitbrink
(74) Attorney, Agent, or Firm—Eric Spencer

(57) ABSTRACT

A nozzle assembly for use in injection molding comprises a pair of spacers acting between the manifold and either a cover plate or a hot runner plate of an injection molding machine to apply a contact pressure between the nozzle body melt channel and the manifold melt channel to achieve a seal therebetween. The resilience of the spacers result in an increased operational temperature range for the nozzle assembly, the contact pressure being generated and/or maintained over the range of the operational temperatures. An additional advantage is provided in that the nozzle assembly is compact and can be closely spaced with similar nozzle assemblies to achieve center spacings as small as eight millimetres. The assemblies can be mounted and/or removed from the cavity of the manifold plate, and/or changing of the nozzle heater elements, without requiring removal of the mold from the injection mold machine. In one embodiment, the nozzle assemblies can be removed or mounted by removing a cover plate from the manifold plate, the cover plate being capable of retaining multiple nozzle assemblies in place. In another embodiment, the nozzle assembly has a mounting flange and one or more bolts extend through the and engage the manifold plate and these bolts allow mounting and removal of the nozzle assembly.

29 Claims, 5 Drawing Sheets

INJECTION MOLDING NOZZLE ASSEMBLY

This application is a divisional of application Ser. No. 09/095,110, filed Jun. 10, 1998 now U.S. Pat. No. 6,062,846.

FIELD OF THE INVENTION

The present invention relates to an injection molding nozzle assembly. More particularly, the present invention relates to an injection molding nozzle assembly which has a relatively wide operating temperature window and/or which can be easily removed and installed without requiring removal of the mold from an injection molding machine.

BACKGROUND OF THE INVENTION

Injection molding nozzles for injection molding are known. For example hot runner injection machines feed liquefied plastic material from the bushing of an injection molding machine to an injection gate of a mold cavity to mold the desired article therein. Examples of prior U.S. Patents relating to injection molding nozzles and machines include 4,173,448; 4,588,367; 4,662,837; 4,682,945; 5,374,182; and 5,533,882, all of which are assigned to the assignee of the present invention and the contents of all of which are incorporated herein by reference.

While injection molding and nozzle assemblies are well known, problems still exist with prior art injection nozzles. For example, leaking of liquefied plastic from various connection points within the nozzle assembly, the manifold and the injection machine is a continuing problem. In particular, such leaked material can remain within the nozzle assembly, being heated for time periods in excess of those intended within normal processes, resulting in crystallization and other deleterious effects in the material. This leaked material can contaminate ongoing injection operations and generally results in difficulty in servicing nozzle assemblies and machines. Further, some materials are corrosive or otherwise aggressive to materials within the nozzle assembly and their continued presence within the nozzle assembly due to leaking can result in decreased service lifetimes.

The problem of leaking has proven to be a difficult one to address due to the wide range of operating temperatures which can be required, depending upon the plastic material and/or injection process. As the nozzle assembly is formed of components subject to thermal expansion and contraction, and in fact such components can have different thermal expansion coefficients, generally a nozzle assembly is designed for use within a relatively narrow operating temperature window such as 20° C. or, at best, 30° C. about the designed operating temperature. While the materials, design and clearances within the nozzle assembly are carefully selected to reduce leaking within the operating temperature window, operation outside this operating temperature window often results in unacceptable leaking.

As will be apparent, a narrow operating temperature window limits use of the nozzle assembly to specific processes and/or configurations. To supply nozzle assemblies with different required operating windows, a supplier must maintain a wide inventory of components with different designs, dimensions and/or which are formed of different materials.

Another difficulty with prior art injection nozzles is that, with the exception of the invention disclosed in the above-mentioned U.S. Pat. No. 5,533,882, injection nozzles can only be serviced by removing the mold from the injection molding machine and then disassembling the mold to remove the nozzle assemblies from the back side of the mold.

SUMMARY OF THE INVENTION

It is an object of the present invention to provide a novel injection molding nozzle assembly and method of assembling an injection molding nozzle assembly which obviates or mitigates at least one disadvantage of the prior art.

According to a first aspect of the present invention, there is provided a nozzle assembly comprising:
an elongate nozzle body having a head and a nozzle tip and a melt channel extending along a longitudinal axis between said head and said tip;
a heater located about said nozzle body to heat said body;
a first spacer connected to said nozzle body and having a first response characteristic to pressure applied thereto in parallel to said axis;
a second spacer to act between said first spacer and an injection mold, said second spacer having a second response characteristic which differs from said first response characteristic, said first and second spacers co-operating to provide a sealing force between said head and a manifold of an injection mold when said nozzle assembly is installed therein and within a selected range of operating temperatures.

According to another aspect of the present invention, there is provided a nozzle assembly having an enhanced operating temperature window, comprising:
an elongate nozzle, body having a head and a nozzle tip and a melt channel extending between said head and said tip along a longitudinal axis;
a heater located about said nozzle body to heat said body;
a first spacer connected to said nozzle body and having a first response characteristic to pressure applied parallel to said longitudinal axis;
a second spacer to act between said first spacer and an injection mold, said second spacer having a second response characteristic to pressure applied parallel to said longitudinal axis which differs from said first response characteristic, said first and second spacers cooperating to provide a contact force to seal a connection between said head and a manifold of said injection mold when said nozzle assembly is installed therein and operated within a temperature window of up to 50° C. from a preselected operating temperature.

According to yet another aspect of the present invention, there is provided a method of assembling an injection nozzle assembly in an injection mold comprising the steps of:
(i) placing a heater element in thermal contact with the exterior of a nozzle body having a head, a nozzle and a melt channel therebetween;
(ii) providing a first spacer at the head of said body and surrounding said melt channel;
(iii) providing a second spacer about said body and routing electrical leads from said heater through an aperture provided through said second spacer;
(iv) inserting said nozzle body and spacers into said injection mold such that said melt channel at said head contacts a melt outlet in a manifold of said injection mold; and
(v) mounting said nozzle body to a manifold plate of said mold such that a sealing contact force is produced by said second spacer acting between said manifold plate and said first spacer and by said first spacer acting between said second spacer and said manifold.

The present invention provides a nozzle assembly with several advantages. The use of two or more spacers with different resilient and/or thermal expansion characteristics results in an acceptable seal between the nozzle body melt channel and the manifold over a relatively wide thermal operating window. The nozzle assembly is particularly compact, allowing center spacings between adjacent nozzles of as little as eighteen millimetres. Further, the nozzle assemblies can be mounted, removed or otherwise accessed easily, from the cavity side of the manifold plate, without requiring removal of the mold from an injection molding machine.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
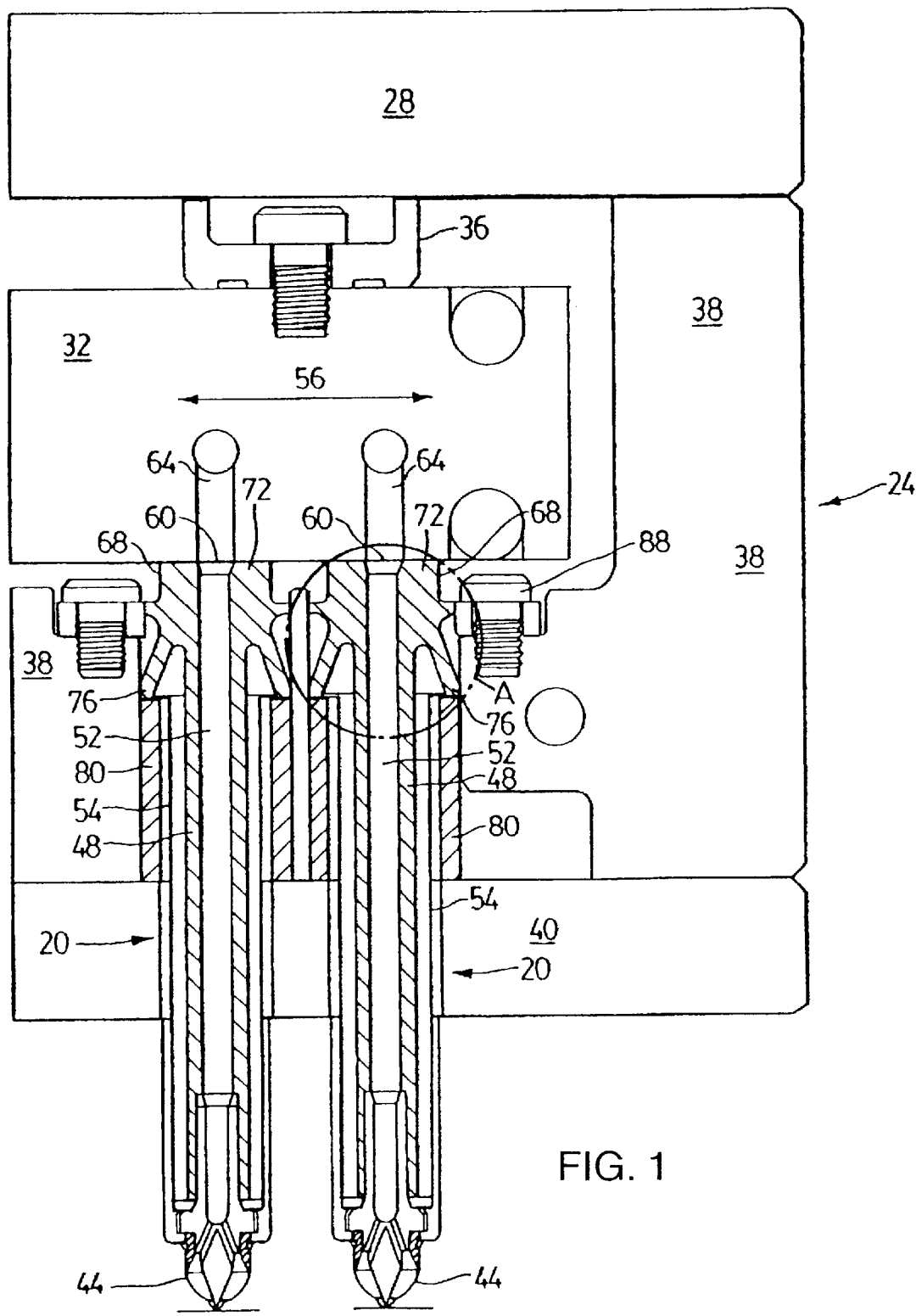
FIG. 1 shows a cross section of a pair of nozzle assemblies in accordance with the present invention.

Each of a pair of nozzle assemblies in accordance with the present invention is indicated generally at reference 20 in FIG. 1. the Nozzle assemblies 20 are shown installed in a conventional injection mold 24 which comprises a manifold backing plate 28, a manifold 32, an insulator-spacer 36 between manifold 32 and manifold backing plate 28, a manifold plate 38 and a cover plate 40. As illustrated, each nozzle 20 has a respective tip 44 extending from cover plate 40 into the cavity of a mold (not shown) which abuts cover plate 40.

In addition to nozzle tip 44, each nozzle assembly 20 includes a nozzle body 48 through which melt channel 52 extends to allow liquefied plastic, or any other material to be molded, to pass from manifold 32 through the head of the nozzle and through melt channel 52 to nozzle tip 44. A heater (not shown) is located about the exterior of nozzle body 48 to heat material within melt channel 52 and a cover sleeve 54 encloses the heater and body 48.

As is known, manifold 32 moves, in the directions indicated by arrow 56, with respect to manifold backing plate 28 and cover plate 40 due to thermal expansion and contraction as injection mold 24 enters or exits its operating temperature window. Accordingly, the connection 60 between melt channel 52 in nozzle body 48 and the outlet 64 of manifold 32 must be able to accommodate this movement while remaining sealed at connection 60 to prevent or reduce leaking of liquefied material.

While many different systems have been developed to attempt to seal connection 60 while accommodating this movement, generally such systems comprise a means to ensure that an upper surface of nozzle body 48 contacts the surface of manifold 32 about outlet 64 under a significant contact pressure, the contact pressure urging manifold 32 and melt channel 52 of nozzle body 48 into a sealed connection.

The assignee of the present invention has previously developed a sealing means whereby a frustoconical spacer is employed at the end of nozzle body 48 adjacent manifold 32 with the end of the frustoconical spacer with the smaller diameter encircling connection 60 and the larger diameter end abutting the manifold plate. It has been determined that this arrangement results in the contact pressure being concentrated about connection 60, thus providing an acceptable seal. The materials from which the spacer is made are selected for their thermal expansion coefficients, to increase the contact pressure as nozzle assembly 20 and the spacer are heated, and for their elasticity. The selection of suitable materials for such spacers is within the normal skill of those skilled in the art of designing injection nozzle assemblies.

In the embodiment of the present invention shown in FIG. 1, a frustoconical spacer 68 is also employed to facilitate sealing of connection 60. As shown, the smaller diameter end 72 of spacer 68 abuts manifold 32 in a substantially conventional manner. However, unlike the prior art spacers described above, the larger diameter end 76 of spacer 68 abuts a second spacer 80 which extends from spacer 68 to cover plate 40. Second spacer 80 is designed to have a different response characteristic to compressive pressures than does spacer 68. This different response characteristic can be achieved by employing different materials having different spring constants, by having different sizes of the spacers (i.e.—spacer 68 can have an overall length of two centimetres while spacer 80 can have an overall length of eight centimetres), by modifying one or both spacers by removing material, etc. In the embodiment shown in FIG. 1, spacer 80 has a different geometric configuration, in this case a cylindrical configuration, than spacer 68 and a different overall length to achieve a different response characteristic. Further, the thermal expansion characteristics of each of spacer 68 and 80 can be different, if desired.

It has been found that, by providing spacer 68 and spacer 80 with a different resilient and/or thermal expansion characteristics, the combination of the two different response characteristics allows an acceptable contact pressure to be maintained at connection 60 over a wider range of operating temperatures than has been obtained from single spacers in the past.

Figure 2:
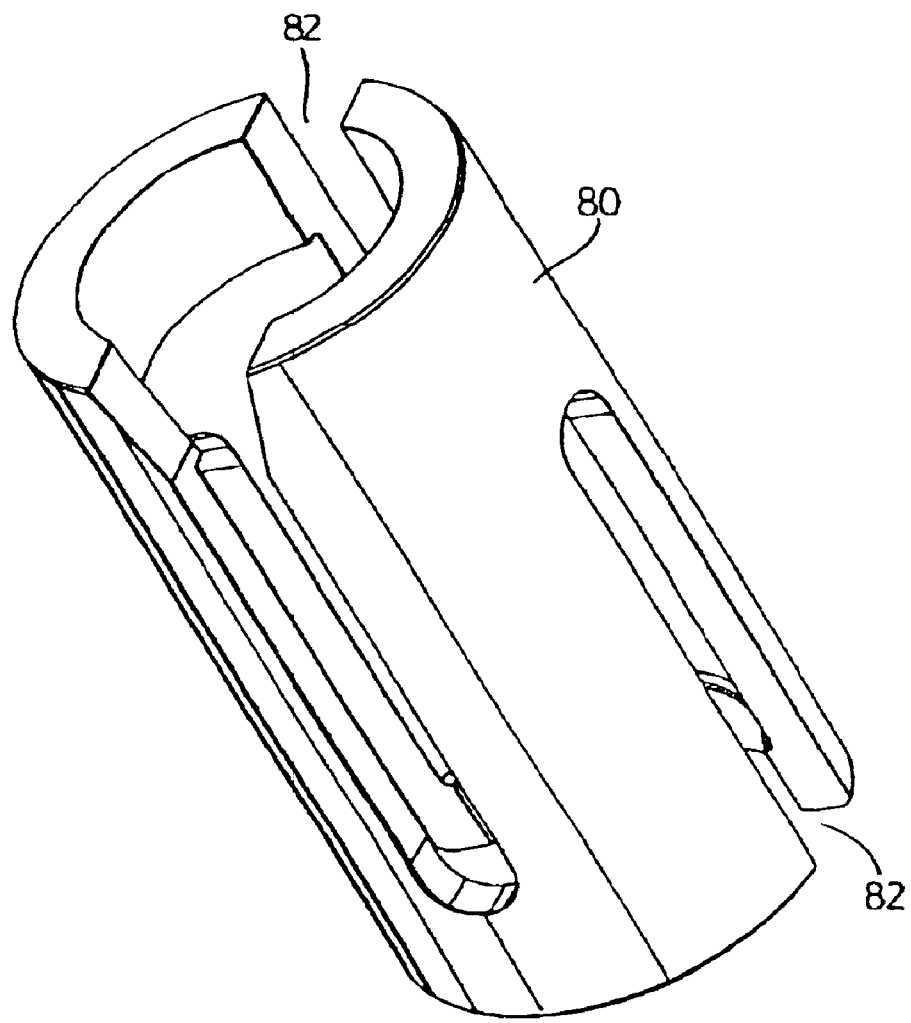
FIG. 2 shows a perspective view of a second spacer employed in an embodiment of the present invention.

It is contemplated that spacer 68 and spacer 80 can be formed in a variety of different geometric configurations, although frustoconical and cylindrical geometries are presently preferred. For example, spacer 68 could be generally tetrahedral and spacer 80 could be tubular with a square cross section. It is also contemplated that the resiliency of either or both of spacer 68 and spacer 80 can be modified, either instead of or in addition to the differences in their geometrical configuration, by varying wall thickness, machining slots, grooves or other regions of altered or removed materials, as will be understood by those of skill in the art. FIG. 2 shows a presently preferred embodiment of a second spacer 80 which has slots 82 formed therein to increase the resiliency of spacer 80. Slots 82 also permit the leads from the heaters (not shown) about nozzle body 48 to be routed therethrough. Similarly, if a thermocouple (not shown) is employed in nozzle body 48, the signal leads from such a thermocouple leads can also be routed through slots 82. If spacer 80 does not include slots 82 or similar features, as aperture can be specifically formed through spacer 80 to permit routing of the leads or another suitable routing can be employed. Routing of heater leads is discussed in more detail below, with respect to the embodiment of FIG. 5 wherein the heater is illustrated.

It is further contemplated that spacer 68 and spacer 80 can be formed of the same material or different materials. In the latter case, the materials employed can have a different modulus of elasticity or a different thermal expansion coefficient, for example. In this latter case, appropriate materials with different thermal expansion coefficients can be selected such that one spacer expands at higher temperatures and/or at a greater rate than the other to provide a wide temperature range in which an acceptable contact pressure can be maintained at connection 60. It is also contemplated that either or both of spacers 68 and 80 can be formed of materials with thermal insulating properties or can be provided with a coating of such materials to assist in thermally insulating nozzle body 48 from the remainder of the injection molding machine or system.

As will be apparent to those of skill in the art, more than two spacers can be employed, if desired. For example, three spacers each fabricated from different materials with different thermal expansion coefficients and/or each with a different modulus of elasticity can be employed to further increase the operating temperature range within which nozzle assembly 20 can be used. Also, a spacer fabricated from a thermal insulating material can be included between spacer 68 and spacer 80, this insulating spacer inhibiting heat transfer between spacer 68 and spacer 80. It is contemplated that such an insulating spacer can be quite short, relative to the length of spacer 80, especially if the insulating spacer is formed of a material selected for its insulating properties and which is otherwise not suitable as a spacer due to its fragility, etc.

It is further contemplated that in some circumstances a single spacer can be employed, but wherein such a single spacer is arranged to provide the desired contact pressure over a wide operating temperature range. Specifically, such a single spacer can have a cylindrical geometric configuration, much like spacer 80, but will also comprise means such as one or more helical slots, vertical grooves (as shown in FIG. 2) and/or portions of reduced wall thickness to improve the ability of the spacer to provide the desired contact pressure over a relatively wide operating temperature range.

As shown in FIG. 1, spacer 68 can be integrally formed as part of nozzle body 48. In this case, spacer 68 can be formed of a material which is selected for its suitability as a nozzle body and spacer 80 and/or additional spacers, if any, can be formed of materials with different thermal expansion and resiliency characteristics.

Figure 3:
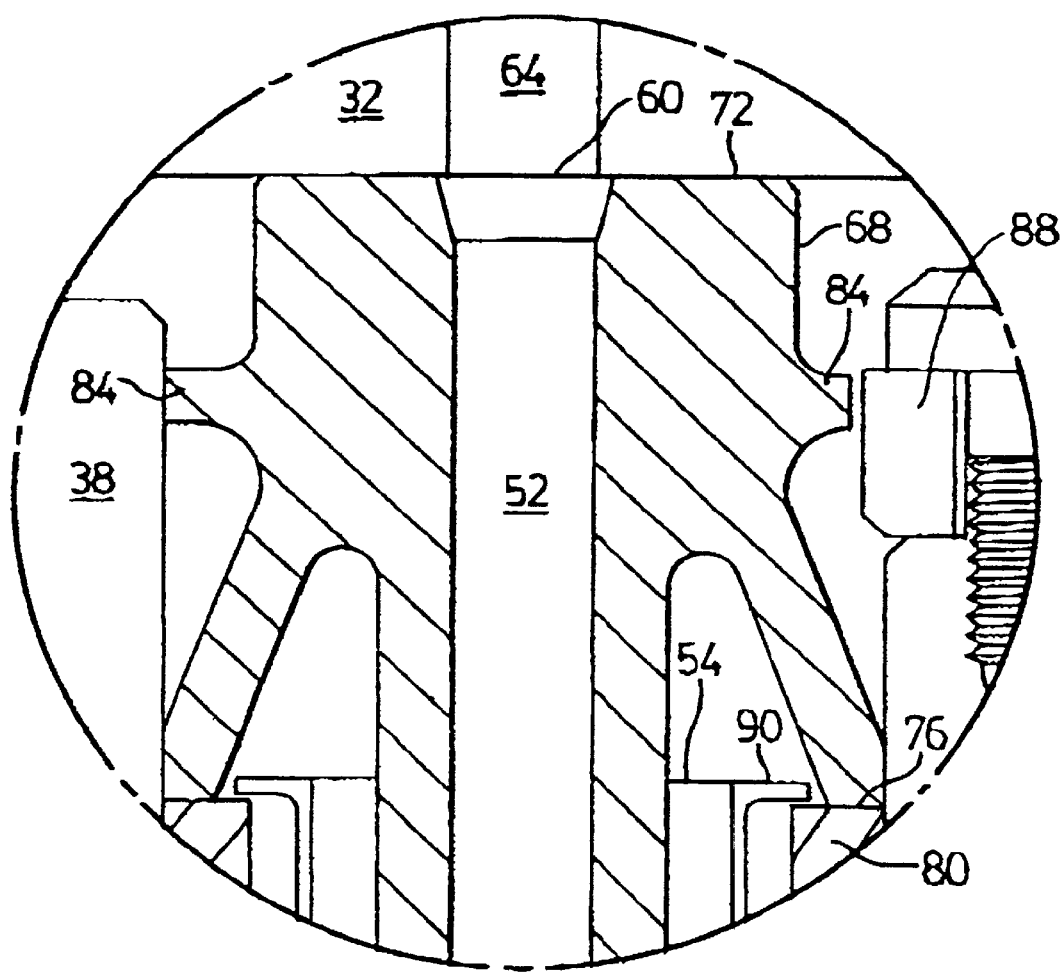
FIG. 3 shows an expanded view of the portion of FIG. 1 within the circle labelled A in FIG. 1.

As is also shown in FIG. 1, and more clearly in FIG. 3, each spacer 68 includes an alignment member 84 which abuts manifold plate 38 and/or an alignment key 88. In the embodiment shown in FIGS. 1 and 3, alignment member 84 is in the form of a ring surrounding spacer 68 and extending radially outward therefrom. While large diameter end 76 of spacer 68 serves to align spacer 68 in manifold plate 38, alignment member 84 is believed to be particularly advantageous in that it is located close to smaller diameter end 72 of spacer 68 and is thus closer to manifold 32, inhibiting movement of spacer 68 as manifold 32 moves, inhibiting the formation of a substantial moment about end 76. FIG. 3 also more clearly shows how cover sleeve 54 is retained in place by a flange 90 located at its upper end and which abuts spacer 80 as shown.

Nozzle assembly 20 of FIGS. 1 and 3 provides additional advantages in that, as shown, the overall outer diameter of the nozzle assembly is relatively small, allowing nozzle assemblies 20 to be arranged in closely spaced arrays in injection mold 24. For example, spaced arrays with a distance of only eighteen millimetres between nozzle tip centers have been achieved. Another advantage of the nozzle assembly 20 is that it can be easily removed from injection molding machine 24, by removing cover plate 40. Once cover plate 40 is removed, spacer 80, spacer 68 and nozzle body 48 can be removed from injection molding machine 24. This permits simple and rapid repair, servicing or exchange of nozzle assemblies 20 and components. When arrays of closely spaced nozzle assemblies 20 are employed, cover plate 40 is believed to offer particular advantages in that it provides for rigid mounting of assemblies 20 within injection mold 24 and provides quick, convenient service access and mounting and removal of nozzle assemblies 20.

Figure 4:
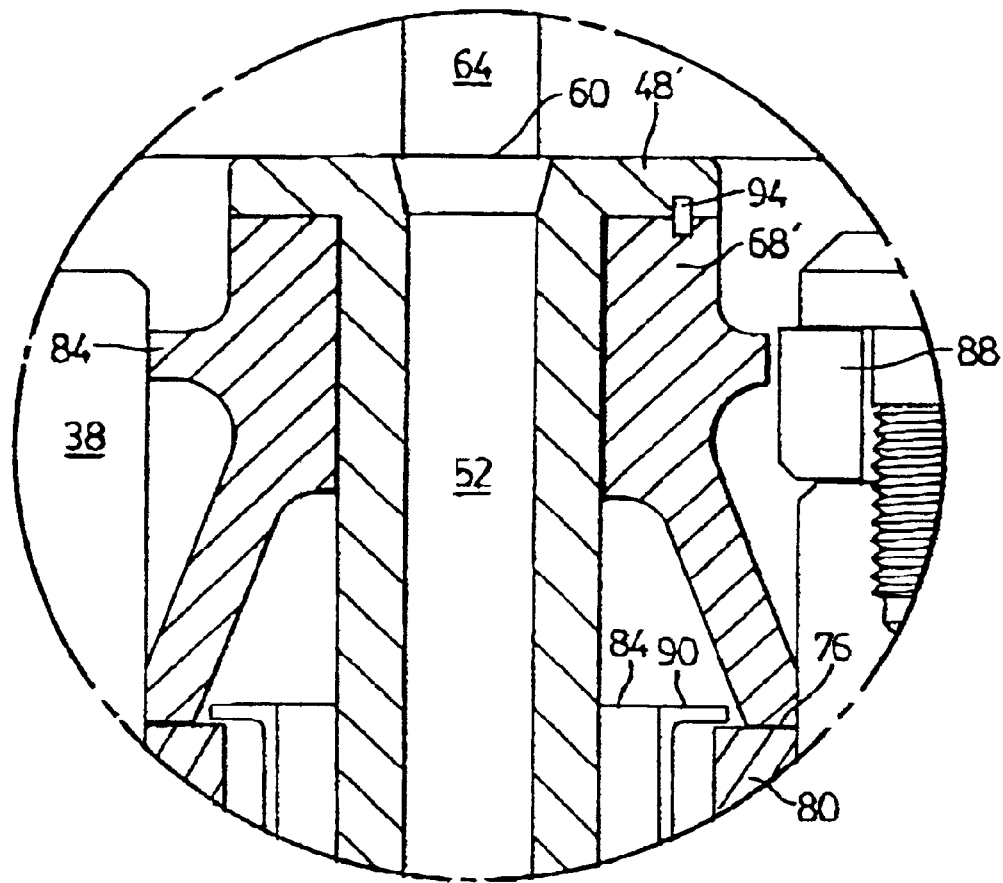
FIG. 4 shows a similar view as that of FIG. 3 of another embodiment of a nozzle body in accordance with an embodiment of the present invention.

FIG. 4 shows another embodiment of the present invention, wherein like components to those of FIGS. 1 and 3 are identified with like reference numerals. In this embodiment, nozzle body 48' does not have spacer 68' integrally formed thereon. Instead, as shown in the Figure, spacer 68' is press-fit to nozzle body 48'. To prevent rotation of nozzle body 48' with respect to spacer 68' and/or key 88, a pin 94 or other suitable locking means is employed between spacer 68' and nozzle body 48'.

Figure 5:
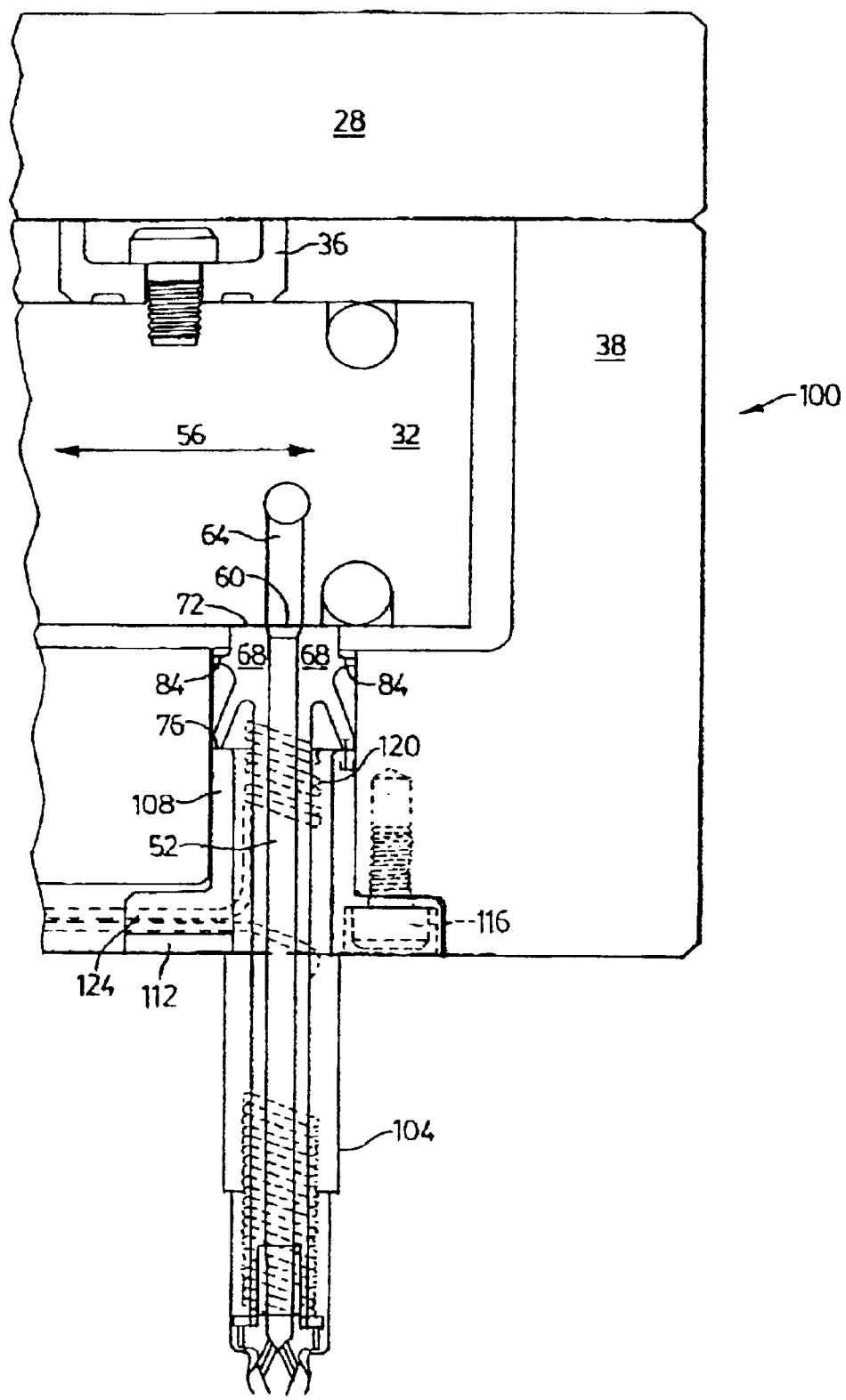
FIG. 5 shows a cross section of another nozzle assembly in accordance with the present invention.

FIG. 5 shows another embodiment of the present invention wherein like components to those of FIGS. 1 and 3 are identified with like reference numerals. In this Figure, an injection mold is indicated generally at 100. Mold 100 includes a nozzle assembly 104 which is similar to nozzle assembly 20 but which is maintained in place in mold 100 without a cover plate. Specifically, second spacer 108 includes a flange 112 which is used to mount nozzle assembly 104 to manifold plate 38. Flange 112 can be fastened to manifold plate 38 via one or more bolts 116 or can include a threaded outer edge (not shown) which engages a complementary set of threads in manifold plate 38. In this latter case, flange 112 can also include recesses which a toolpiece can engage to rotate flange 112 to disengage the threads. In either case, nozzle assembly 104 can be easily and rapidly removed from the cavity side of injection mold 100. In this Figure, the nozzle heater 120 is illustrated and the leads 124 for heater 120 are routed through a slot (not shown but similar to slot 82) in spacer 108.

Again, more than two spacers can be employed, if desired, in which case the spacer most distal connection 60 will be fastened to manifold plate 38 by a suitable means, such as flange 112 and bolts or threads.

It is also contemplated that spacer 108 can be mounted in manifold plate 38 via a bayonet-type connection, one half of which is formed in plate 38 and the other half of which is formed on spacer 108, via a set of threads formed on the exterior of spacer 108 and which are complementary to a set of threads in plate 38 or via a retaining ring which is screwed into a set of threads in plate 38 once spacer 108 is installed therein.

The present invention provides a nozzle assembly with good sealing characteristics over a relatively wide operating temperature window and which is particularly compact, allowing center spacings between adjacent nozzles of eighteen millimetres. The embodiment of FIGS. 1 and 3 has been found to have an operating temperature window of about 50° C. (±25° C.) about the designed operating temperature when spacer 80 (including slots 82 as shown in FIG. 2) is fabricated from NAK55 steel. The actual temperature operating window size will vary depending upon the size of manifold 32 and the materials employed.

The nozzle assemblies can be mounted, removed or otherwise accessed easily, without requiring removal of the mold from an injection molding machine.

The above-described embodiments of the invention are intended to be examples of the present invention and alterations and modifications may be effected thereto, by those of skill in the art, without departing from the scope of the invention which is defined solely by the claims appended hereto.

I claim:

1. A nozzle assembly comprising:
   an elongate nozzle body having a head and a nozzle tip and a melt channel extending along a longitudinal axis between said head and said tip;
   a heater located about said nozzle body to heat said body;
   a first spacer connected to said nozzle body and having a first response characteristic to pressure applied thereto in parallel to said axis;
   a second spacer to act between said first spacer and an injection mold, said second spacer having a second response characteristic which differs from said first response characteristic, said first and second spacers cooperating to provide a sealing force between said head and a manifold of an injection mold when said nozzle assembly is installed therein and within a selected range of operating temperatures, said second spacer not contacting the manifold.

2. A nozzle assembly according to claim 1, wherein no structure except said second spacer acts between said first spacer and a cover plate of said injection mold.

3. A nozzle assembly according to claim 2, wherein said second spacer includes a flange adjacent a first end of said spacer, said flange operable to mount said second spacer to a manifold plate of said injection mold.

4. A nozzle assembly according to claim 3, wherein said flange is bolted to said manifold plate.

5. A nozzle assembly according to claim 3, wherein said flange is circular and includes a set of threads on its periphery, said set of threads operable to engage a complementary set of threads in said manifold plate to retain said nozzle assembly therein.

6. A nozzle assembly according to claim 1, wherein said second spacer contacts said first spacer on an annular plane perpendicular to the central axis of said nozzle assembly.

7. A nozzle assembly according to claim 6, wherein both said first and second spacers comprise co-axial, hollow cylindrical shapes.

8. A nozzle assembly according to claim 2, wherein said nozzle assembly is removable from the cavity side of said injection mold by removing said cover plate and extracting said nozzle assembly from said cavity side.

9. A nozzle assembly according to claim 3, wherein said nozzle assembly is removable from the cavity side of an injection mold by disconnecting said flange from said manifold plate and extracting said nozzle assembly from said cavity side.

10. A nozzle assembly according to claim 1 wherein said first spacer includes means to align said nozzle assembly within an injection mold, said means to align being proximal to said head.

11. A nozzle assembly according to claim 10, wherein said means to align comprises a radially upstanding portion on the outer periphery of said first spacer which extends perpendicular to said melt channel to abut a portion of an injection mold.

12. A nozzle assembly according to claim 1, wherein compressive forces passing between the manifold and the head pass serially through said first and second spacers.

13. A nozzle assembly according to claim 1 wherein said first spacer is integrally formed with said nozzle body.

14. A nozzle assembly according to claim 13 wherein said second spacer is formed of a second material which is different than a first material from which said first spacer is formed.

15. A nozzle assembly according to claim 1 wherein said second spacer is formed of a different material than said first spacer.

16. A nozzle assembly according to claim 14 wherein said first material has a different thermal expansion coefficient than said second material.

17. A nozzle assembly according to claim 1, wherein said second spacer includes at least one area of different diameter.

18. A nozzle assembly according to claim 17, wherein the area of different diameter includes a plurality of areas of reduced diameter.

19. A nozzle assembly according to claim 1, where in said first spacer contacts the manifold but not the head, and wherein said second spacer con tacts the head but not the manifold.

20. A nozzle assembly having an enhanced operating temperature window, comprising:
   an elongate nozzle body having a head and a nozzle tip and a melt channel extending between said head and said tip along a longitudinal axis;
   a heater located about said nozzle body to heat said body;
   a first spacer connected to said nozzle body and having a first response characteristic to pressure applied parallel to said longitudinal axis;
   a second spacer to act between said first spacer and an injection mold, said second spacer having a second response characteristic to pressure applied parallel to said longitudinal axis which differs from said first response characteristic, said first and second spacers co-operating to provide a contact force to seal a connection between said head and a manifold of said injection mold when said nozzle assembly is installed therein and operated within a temperature window of up to 50 degrees celsius from a preselected operating temperature, said second spacer not touching the manifold.

21. Injection mold spacer apparatus sealing an injection nozzle head and a manifold, comprising:
   a first spacer coupled to the injection nozzle and carrying compressive force between the manifold and a plate structure; and
   a second spacer contacting said first spacer and the plate structure, said second spacer being disposed such that the compressive force between the manifold and the plate structure is carried serially, and not in parallel, through said first and second spacers to seal the injection nozzle head and the manifold, said first and second spacers having different shapes to provide different response characteristics to the compressive force.

22. Apparatus according to claim 21, wherein said second spacer does not contact the manifold.

23. Apparatus according to claim 21, wherein said first and second spacers comprise co-axial, hollow, cylindrical shapes.

24. Apparatus according to claim 21, wherein said first spacer has a frustoconical portion.

25. Injection molding apparatus to seal an injection nozzle and a manifold, comprising:
   a fist spacer integral with a head of the injection nozzle and in contact with the manifold; and
   a second spacer not integral with the injection nozzle and in contact with said first spacer, said second spacer not in contact with the manifold and passing longitudinal compressive force only serially to the manifold through said first spacer, said s econd spacer having a different response characteristic to the compressive force than said first spacer.

26. Apparatus according to claim 25, wherein at least one of said first and second spacers has a plurality of different diameters.

27. Apparatus according to claim 25, wherein a portion of said first spacer is disposed inside said second spacer.

28. Apparatus according to claim 25, wherein said first spacer and said second spacer are in contact on an annular, horizontal plane.

29. Apparatus according to claim 25, wherein said second spacer includes a flange to couple said second spacer to a plate.

* * * * *